Figure 1:
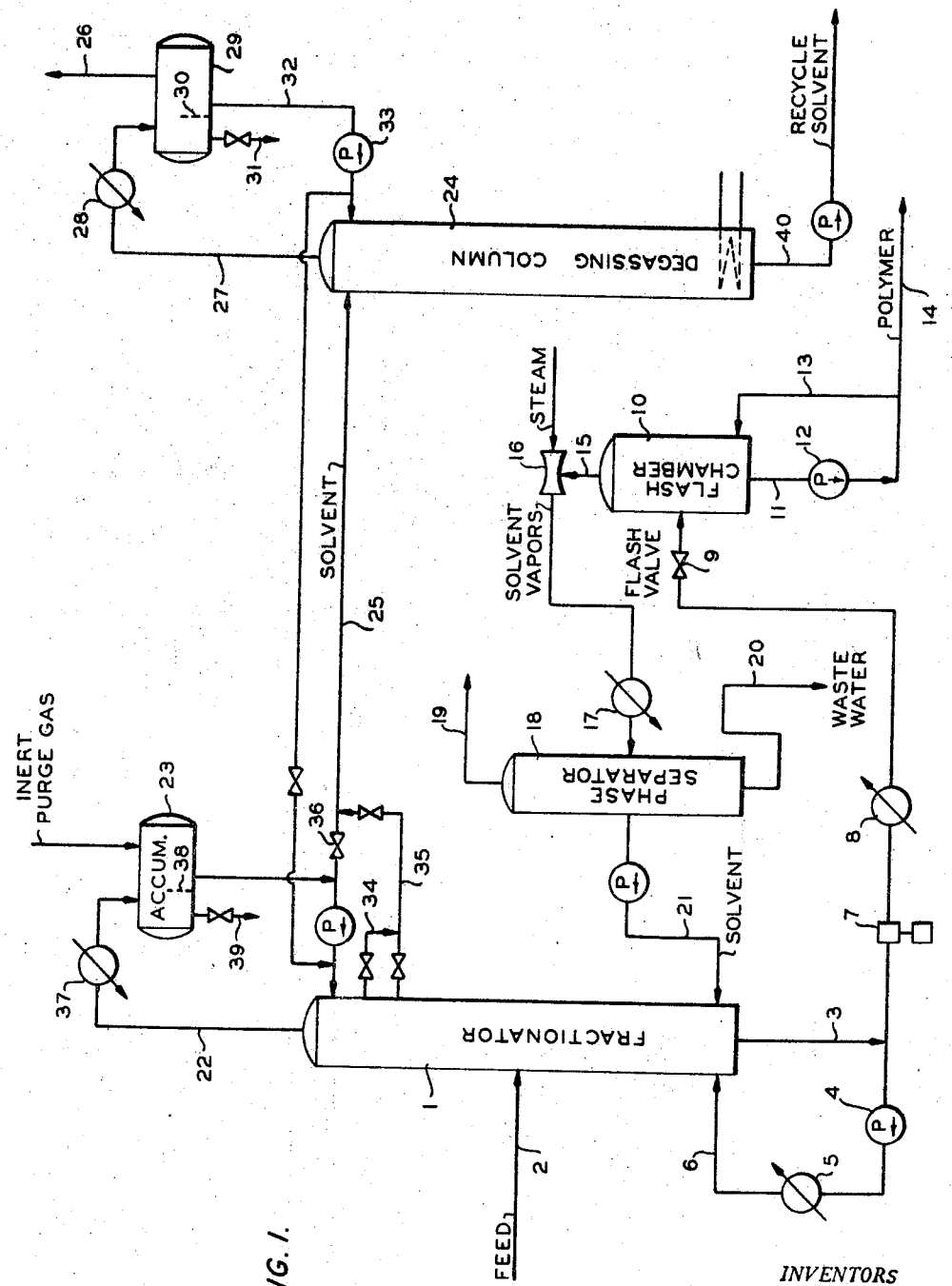

INVENTORS
J. I. STEVENS
J. E. COTTLE
BY Hudson and Young
ATTORNEYS

April 2, 1963

J. I. STEVENS ET AL
PURIFICATION OF SOLVENTS USED IN THE
POLYMERIZATION OF OLEFINS 3,084,149

Filed Oct. 22, 1956

2 Sheets-Sheet 2

FIG. 2.

INVENTORS
J. I. STEVENS
J. E. COTTLE
BY Hudson and Young
ATTORNEYS

United States Patent Office 3,084,149
Patented Apr. 2, 1963

3,084,149
PURIFICATION OF SOLVENTS USED IN THE POLYMERIZATION OF OLEFINS
James I. Stevens, Idaho Falls, Idaho, and John E. Cottle, Bartlesville, Okla., assignors to Phillips Petroleum Company, a corporation of Delaware
Filed Oct. 22, 1956, Ser. No. 617,586
2 Claims. (Cl. 260—94.9)

This invention relates to a method and a means for purification of the solvent used in a solution polymerization process applied to olefins. In one specific aspect, the invention relates to the removal of impurities from a polymerization solvent including low molecular weight polymer and water which are in solution in the solvent.

In the manufacture of polymers from olefinic hydrocarbons one process utilizes a solvent to dissolve the reactant olefins and to dissolve the polymer which is formed. It is desirable to reuse the solvent in the reaction, however, it is necessary that the small amounts of polymer, which remain in the solvent following the polymer recovery step, be removed. Soluble polymers of this type upon being concentrated, become exceedingly viscous and have very poor heat transfer characteristics, therefore, they must be removed as a kettle product from a conventional distillation column in concentrations not exceeding about 25 weight percent in order to avoid fouling the heat exchange equipment in the distillation column. These bottoms products are usually discarded because of the difficulties encountered in making a further separation. The solvent which is discarded represents a considerable increase in the cost of polymer produced and the polymer discarded also represents a waste of useful product.

The concentration of the polymer in the solvent and the type of polymer in the solvent are functions of various factors including the type of recovery method used, the manner in which the recovery process is operated and the amount of the low molecular weight polymer produced in the polymerization reaction. The major portion of the polymer is recovered by suitable means, such as precipitation by cooling the solution to the necessary temperature to solidify the polymer. An alternative method for recovering the polymer from the solvent is by the water coagulation method which comprises dispersing the solution of polymer in water under conditions of temperature and pressure to maintain the solvent and water in the liquid phase and separating the solid polymer therefrom.

It has recently been discovered that 1-olefins having a maximum of 8 carbon atoms per molecule and no branching nearer the double bond than the 4-position can be polymerized to solid and semi-solid polymers at temperatures and pressures which are relatively low as compared to conventional processes for polymerizing such olefins. Such polymerization is generally carried out by first admixing and at least partially dissolving the olefins in a non-polymerizable solvent and by carrying out the polymerization in the presence of a catalyst. Such process is disclosed in the copending application of Hogan and Banks, Serial No. 573,877, filed March 26, 1956, now U.S. Patent No. 2,825,721, for producing polymers of 1-olefins by carrying out the polymerization at a temperature in the range of 100 to 500° F. in the presence of 0.1 to 10 or more weight percent chromium as chromium oxide, preferably including a substantial portion of hexavalent chromium associated with at least one porous oxide selected from the group consisting of silica, alumina, zirconia and thoria. A preferred catalyst is one comprising 0.1 to 10 or more weight percent chromium as chromium oxide supported upon a silica-alumina base such as 90 percent silica–10 percent alumina. The catalyst employed is usually a highly oxidized catalyst which has been activated by treatment at an elevated temperature under non-reducing conditions and preferably in an oxidizing atmosphere. Usually sufficient pressure is maintained in the reactor to insure that the desired amount of olefin is liquefied or dissolved in the solvent to provide the desired polymerization.

Polymerization usually is carried out in the liquid phase such as in solution in a hydrocarbon solvent, especially a paraffin or cycloparaffin which is liquid under the polymerization conditions; however, vapor phase operation or mixed phase operation can be effected. Diolefins such as 1,3-butadiene are within the scope of this invention since any olefinic material having olefinic linkage in the 1-position, as described, comes within the scope of the invention of the above-identified copending application.

It is an object of this invention to provide an improved means for removing small amounts of soluble polymer from a solvent to be used in the solution polymerization of olefins. It is also an object of this invention to provide means for processing viscous polymer solutions. It is still another object of this invention to provide a unitary system for the removal of dissolved polymer, dissolved water and low boiling impurities from a solvent to be used in the solution polymerization of olefins. Other and further objects and advantages of this invention will become apparent to one skilled in the art upon study of this disclosure including the attached drawing.

FIGURE 1 of the drawing is a schematic illustration of a preferred specific embodiment of the invention.

FIGURE 2 is a flow diagram of an olefin polymerization process in which the invention is utilized.

Broadly, the invention contemplates heating a viscous solution of polymer and solvent, obtained as the bottoms product from a solvent distillation step; vaporizing a substantial portion of the solvent contained in the viscous solution; returning the solvent to the solvent distillation step; recovering the stripped polymer as a product of the process and simultaneously separating and removing water and light gases from the solvent obtained as the overhead product of the solvent distillation step.

Referring now to FIGURE 1 of the drawing, a solvent recovered from an olefin polymerization process containing a small amount of dissolved low molecular weight polymer and small amounts of water and light impurities is fed to fractionator 1 through line 2, preferably about one-third of the distance from the bottom to the top of the column. The fractionator is ordinarily operated at pressures ranging from atmospheric to 100 p.s.i., preferably in the range of 40–60 p.s.i.

The feed is fractionated to produce an overhead product comprising essentially solvent containing small amounts of light impurities and water and a bottoms product comprising a mixture of polymer and solvent. The viscous bottoms product is removed from fractionating column through line 3, a portion is passed through pump 4, heater 5, and returned to the column through line 6; the other portion is passed through pump 7, heater 8, and flash valve 9 to flash chamber 10. The flash chamber can be operated at atmospheric, super-atmospheric, or sub-atmospheric pressures, but sub-atmospheric pressures are preferred because at sub-atmospheric pressures the solvent can be evaporated from the solvent-polymer solution at lower temperature. Atmospheric or super-atmospheric pressures may be required when processing a relatively high molecular weight polymer to prevent solidification of the polymer in the flash chamber. Flashed polymer solution, usually containing about 50 weight percent polymer, is removed from the bottom of the flash chamber through line 11 and passed through pump 12, a portion of this material being recycled to the flash chamber through line 13 and the other portion being removed through line 14 as a product of the process. It is usually desirable to maintain a flow of material through pump 12 and line 13 at all times even though product may be removed through line 14 intermittently.

Solvent vapors are removed from the flash chamber through line 15 by any suitable vapor compressor device such as steam jet 16 and are passed through condenser 17 to phase separator 18. Non-condensible material, if present, is removed through line 19 and water is removed from the bottom of the separator through line 20, which is preferably an S-shaped line so as to automatically withdraw water to maintain a predetermined interface level. The liquefied solvent, which forms a separate phase, is passed to fractionator 1 through line 21.

Vapors are removed from the top of fractionator 1 through line 22, cooled and passed to accumulator 23 wherein an inert purge gas can be introduced, if desired, to prevent oxygen from entering the accumulator and being dissolved in the solvent. Solvent is passed through line 25 to degassing column 24 wherefrom any non-condensible material present in the solvent is vented through line 26. Water vapors which may be present in the degassing column overhead product line 27 is condensed in cooler 28 and is trapped in separator-accumulator 29 by baffle 30 and is withdrawn through line 31. Solvent which is collected in separator-accumulator 29 is returned to degassing column 24 through line 32 and pump 33 as reflux for the degassing column.

The system can be operated so as to remove water from the overhead product of solvent purification fractionator 1 by withdrawing liquid from upper level trays of fractionator 1 through lines 34 and 35 and bypassing this material through line 25 as feed to degassing column 24. In this case valve 36 in line 25 will be closed. Water vapor contained in the fractionator overhead product line 22 will be condensed in cooler 37, will be trapped out in accumulator-separator 23 by baffle 38 and can be withdrawn through line 39.

Purified solvent is withdrawn from degassing column 24 through line 40 and is substantially free from dissolved polymer, water and light materials.

Vapors can be withdrawn from the flash chamber by utilizing a steam jet as shown in the drawing in which case the steam and solvent vapors are cooled and condensed and the free water is removed from the solvent. The presence of water is generally undesirable in a polymerization reaction and should be removed from the solvent which is returned to the system. A phase separator is advantageously utilized together with a steam jet to remove the free water introduced with a steam jet. Other means can be utilized to withdraw vapors from the flash chamber, for example, a vacuum pump can be employed, in which case water is not introduced and a phase separator is not required. The solvent can be introduced as a vapor or liquid to fractionator 1 at any point intermediate the upper and lower outlets but preferably is introduced below the bottom bubble tray.

A better understanding of our invention will result from a study of the following specific embodiment of the invention herewith presented as applied to the process illustrated in FIGURE 2 of the drawing. The specific embodiment is intended to be exemplary and is not to be construed as limiting the invention.

Ethylene is polymerized in cyclohexane solvent in the presence of a catalyst comprising chromium oxide on silica-alumina at a temperature of 285° F. and a pressure of 500 p.s.i.a. The catalyst is prepared by impregnating silica-alumina, 90/10, with chromium trioxide solution, followed by drying and activating the catalyst with dry air for about 6 hours at 960° F.

Ethylene is supplied to reactor 44 at the rate of 3520 lbs. per hour along with catalyst from supply 42 at the rate of 97 lbs. per hour and cyclohexane solvent from supply 41 at the rate of 35,000 lbs. per hour. The reaction products pass from reactor 44 via conduit 46 to flash chamber 47 where substantially all of the unreacted ethylene together with some ethane and methane is vaporized and removed via conduit 49. Flash chamber 47 is operated at 285° F. and 100 p.s.i.a. Gases are vented via 57 at the rate of 361 lbs per hour. Polymer dissolved in solvent and solid catalyst are removed from flash chamber 47 via 50 and sufficient dilution solvent is added to reduce the viscosity of the polymer solution so as to facilitate filtering. The catalyst is filtered from the polymer solution at about 300° F. and 150 p.s.i.a. in separation zone 51 and catalyst is removed via 52 at the rate of 97 lbs. per hour. The polymer solution is removed from catalyst separation zone 51 via 53 and is passed to polymer separation zone 54 where it is cooled so as to precipitate the polymer as a solid which is then removed by filtering. Solid polymer is removed via 55 at the rate of 3120 lbs. per hour.

The solvent, recovered in separation zone 54 is passed to distillation column (fractionator) 1 via conduit 2 at a rate of 87,000 lbs. per hour or 221 gal. per minute. Distillation column 1 is operated at 50 p.s.i.a. with a kettle temperature of 265° F. and an overhead temperature of 262° F. Kettle product is removed from distillation column 1, the temperature is raised to 400° F., the pressure is raised to 325 p.s.i.a., and the kettle product is then flashed into flash chamber 10 at a pressure of 6.5 p.s.i.a. and a temperature of 130° F. Viscous polymer solution is withdrawn from flash chamber 10 at a rate of 0.1 gallon per minute.

Steam is introduced to steam jet 16 at 315 p.s.i.a. at a rate of 210 pounds per hour to remove vapors from flash tank 10. The temperature of the steam jet effluent is reduced from 280° F. to 100° F. and the pressure is raised to atmospheric in phase separator 18. Free water is removed through conduit 20 which acts as a siphon to maintain the water in separator 18 at a constant level. Solvent is returned to distillation column 1. Overhead vapors from distillation column 1 are cooled and condensed in condenser 37 and passed to accumulator 23. Sufficient condensate is returned to distillation column 1 as reflux to knock down substantially all of the polymer and the remaining portion is passed to degassing column 24 at a temperature of 105° F.

Column 24 is operated at a pressure of 20 p.s.i.a., a kettle temperature of 200° F. and an overhead temperature of 190° F. The overhead vapors from column 24 are cooled and condensed in condenser 28 and passed to accumulator 29 from which non-condensible gases and water vapor are vented at a rate of 1253 pounds per day. Condensate is returned to column 24 as reflux and solvent is removed as kettle product at the rate of 221 gallons per minute less the gases vented through 26 and the viscous polymer solution removed through 14 which represents less than one gallon per minute.

In the above description, the polymerization of ethylene is described, however, the invention is applicable to the removal of polymer from solvent derived from the polymerization of other olefins such as 1-olefins having a maximum chain length of 8 carbon atoms and no branching nearer the double bond than the 4-position as well as diolefins having a terminal double bond with no branching nearer the 3-position from said double bond.

Similarly, the preferred catalyst and the preferred solvent have been described however, other catalysts and solvents which have been disclosed are applicable in polymerization reactions wherein this invention is useful.

Reasonable variations and modifications are possible within the scope of the disclosure of this invention, the essence of which is the provision of a unitary system for removal of polymer and water from a solvent utilized in the solution polymerization of olefins.

That which is claimed is:

1. In the method for recovering solvent for reuse in polymerizing olefins in solution in an inert solvent wherein normally solid polymer remains in the solvent separated from the polymerization zone effluent, the improvement comprising subjecting said solvent from which at least about 90 weight percent of the normally solid polymer produced in said polymerization zone has been removed to distillation; removing a bottom product comprising a viscous solution of not more than about 25 weight percent polymer in solvent from the bottom of said distillation; passing a stream consisting essentially of said bottom product to a zone of reduced pressure; removing, from said zone of reduced pressure, vapors evolved from said bottom product; removing a polymer rich stream from said zone of reduced pressure; condensing said vapors; passing the resulting condensate to said distillation; cooling and condensing at least a portion of the overhead vapors of said distillation; removing free water from the condensate; returning a first portion of condensate to said distillation as reflux; passing a second portion of condensate to a degassing and dehydrating step; cooling and condensing at least a portion of the overhead vapors of said degassing and dehydrating step; removing free water from the condensate; removing non-condensed vapor; returning condensate to said degassing and dehydrating step as reflux; and recovering solvent substantially free of polymer, water, and light gases as a bottom product of said degassing and dehydration step for reuse in said polymerization.

2. In the method for recovering solvent for reuse in polymerizing olefins in solution in an inert solvent wherein normally solid polymer remains in the solvent separated from the polymerization zone effluent, the improvement comprising subjecting said solvent from which at least about 90 weight percent of the normally solid polymer produced in said polymerization zone has been removed to distillation; removing a bottom product comprising a viscous solution of not more than about 25 weight percent polymer in solvent from the bottom of said distillation; passing a stream consisting essentially of said bottom product to a zone of reduced pressure; removing, from said zone of reduced pressure, vapors evolved from said bottom product; removing a polymer rich stream from said zone of reduced pressure; condensing said vapors; passing the resulting condensate to said distillation; cooling and condensing at least a portion of the overhead vapors of said distillation; removing free water from the condensate; returning the condensate to said distillation as reflux; passing liquid from the upper portion of said distillation to a degassing and dehydrating step; cooling and condensing at least a portion of the overhead vapors of said degassing and dehydrating step; removing free water from the condensate; removing non-condensed vapor; passing the condensate from the degassing column overhead product to the condensate from said distillation column overhead product and recovering solvent substantially free of polymer, water, and light gases as the bottom product of said degassing and dehydration step for reuse in said polymerization.

References Cited in the file of this patent

UNITED STATES PATENTS

| | | |
|---|---|---|
| 2,350,400 | King | June 6, 1944 |
| 2,484,384 | Levine et al. | Oct. 11, 1949 |
| 2,638,437 | Ragatz | May 12, 1953 |
| 2,691,647 | Field et al. | Oct. 12, 1954 |
| 2,726,231 | Field et al. | Dec. 6, 1955 |
| 2,745,889 | Johnston et al. | May 15, 1956 |
| 2,766,224 | Bannon | Oct. 9, 1956 |
| 2,825,721 | Hogan et al. | Mar. 4, 1958 |
| 2,837,504 | Hanson et al. | June 3, 1958 |
| 2,860,125 | Lanning | Nov. 11, 1958 |
| 2,860,126 | Cines | Nov. 11, 1958 |
| 2,894,824 | Lanning | July 14, 1959 |
| 2,897,184 | Kimble et al. | July 28, 1959 |
| 2,943,082 | Cottle | June 28, 1960 |